United States Patent
Hooper et al.

(10) Patent No.: US 12,533,410 B2
(45) Date of Patent: Jan. 27, 2026

(54) NUCLEIC ACID VACCINE COMPOSITION COMPRISING A LIPID FORMULATION, AND METHOD OF INCREASING THE POTENCY OF NUCLEIC ACID VACCINES

(71) Applicants: The Government of the United States, as Represented by the Secretary of the Army, Fort Detrick, MD (US); Arcturus Therapeutics, Inc., San Diego, CA (US)

(72) Inventors: Jay W. Hooper, New Market, MD (US); Eric M. Mucker, Thurmont, MD (US); Padmanabh Chivukula, San Diego, CA (US)

(73) Assignees: The Government of the United States, as Represented by the Secretary of the Army, Fort Detrick, MD (US); Arcturus Therapeutics, Inc., San Diego, CA (US)

( * ) Notice: Subject to any disclaimer, the term of this patent is extended or adjusted under 35 U.S.C. 154(b) by 52 days.

(21) Appl. No.: 18/235,432

(22) Filed: Aug. 18, 2023

(65) Prior Publication Data

US 2023/0390389 A1 Dec. 7, 2023

Related U.S. Application Data

(62) Division of application No. 16/482,500, filed as application No. PCT/US2018/025482 on Mar. 30, 2018, now abandoned.

(60) Provisional application No. 62/478,875, filed on Mar. 30, 2017.

(51) Int. Cl.

| | |
|---|---|
| A61K 39/39 | (2006.01) |
| A61K 39/12 | (2006.01) |
| A61K 39/275 | (2006.01) |
| C12N 7/00 | (2006.01) |
| A61K 39/00 | (2006.01) |

(52) U.S. Cl.
CPC .............. *A61K 39/39* (2013.01); *A61K 39/12* (2013.01); *A61K 39/275* (2013.01); *C12N 7/00* (2013.01); *A61K 2039/53* (2013.01); *A61K 2039/55511* (2013.01); *C12N 2760/12134* (2013.01); *C12N 2760/12171* (2013.01)

(58) Field of Classification Search
None
See application file for complete search history.

(56) References Cited

U.S. PATENT DOCUMENTS

| | | |
|---|---|---|
| 2006/0223769 A1 | 10/2006 | Dow et al. |
| 2009/0263407 A1 | 10/2009 | Dande et al. |
| 2014/0242152 A1 | 8/2014 | Geall et al. |
| 2015/0141678 A1 | 5/2015 | Payne et al. |
| 2015/0239834 A1 | 8/2015 | Payne et al. |

FOREIGN PATENT DOCUMENTS

| | | |
|---|---|---|
| WO | WO-2016/081029 A1 | 5/2016 |
| WO | WO-2017/019523 A1 | 2/2017 |

OTHER PUBLICATIONS

Sellins et al., Molecular Therapy, 2005, 12(3):451-459. (Year: 2005).
Transfection Reagents (available at https://www.thermofisher.com/us/en/home/life-science/cellculture/transfection/transfection-reagents.html) (last visited Jan. 25, 2023).
Lipofectamine™ MessengerMAX™ Transfection Reagent (available at https://www.thermofisher.com/order/catalog/product/LMRNA001) (last visited Jan. 25, 2023).
Mucker, Eric M. et al., "Lipid Nanoparticle Formulation Increases Efficiency of DNA-Vectored Vaccines/Immunoprophylaxis in Animals Including Transchromosomic Bovines," Scientific Reports, vol. 10, 1 8764, May 29, 2020 (with supplemental materials).
Perley, Casey C et al., "Anti-HFRS Human IgG Produced in Transchromosomic Bovines Has Potent Hantavirus Neutralizing Activity and Is Protective in Animal Models," Frontiers in Microbiology, vol. 11, 832, May 7, 2020.
European Patent Office, Extended European Search Report for European Patent Application No. 18777243.9, dated Dec. 15, 2020.

(Continued)

*Primary Examiner* — Nicole Kinsey White
(74) *Attorney, Agent, or Firm* — Banner & Witcoff, Ltd.

(57) ABSTRACT

A nucleic acid vaccine composition comprising one or more of a plasmid-based nucleic acid vaccine and immunotherapy, as well as a lipid formulation, is provided. In addition, the present invention provides a method of enhancing the potency of plasmid-based DNA vaccines and immunotherapies, by formulating a vaccine and/or immunotherapy in a lipid formulation, which is stable when refrigerated or stored frozen, is then delivered to a vaccinee by either needle/syringe, jet injection, or microneedles. The lipid formulation of the present invention comprises one or more lipid excipients selected from 1,2-Distearoyl-sn-glycero-3-phosphocholine, Cholest-5-en-3β-ol, 1,2-Dimyristoyl-rac-glycero-3-methylpolyoxyethlene, and or more symmetric ionizable cationic lipids. The present invention increases vaccine potency dramatically. It was unexpectedly discovered that the level of immunogen, or immune response molecules, produced in vivo is increased (versus administering merely the vaccine or immunotherapy) and, in the case of a vaccine immunogen, the immune response is enhanced.

12 Claims, 5 Drawing Sheets

(56) References Cited

OTHER PUBLICATIONS

Ramaswamy, S. et al., "Systemic delivery of factor IX messenger RNA for protein replacement therapy," PNAS, 2017, 114(10): E1941-E1950.
Alpar, H. O. et al., "Strategies for DNA vaccine delivery," Expert Opin. Drug Deliv., 2005, 2(5): 829-842.
International Search Report for PCT/US2018/025482 mailed Jul. 9, 2018.
Written Opinion of the International Searching Authority for PCT/US2018/025482 mailed Jul. 9, 2018.

Andes Virus Pseudovirion Neutralization (PsNVA)

- Rabbit #81
- Rabbit #80
- + Control

FIG. 2A

Authentic Andes Virus PRNT

- Rabbit #81
- Rabbit #80

FIG. 2B

| Day | Unformulated | | Formulated | |
| --- | --- | --- | --- | --- |
| | Mean | %CV | Mean | %CV |
| 7 | 14.1 | - | 180.8 | 90.0 |
| 14 | 391.3 | 114.3 | 11,648.7 | 69.8 |
| 38 | 388.5 | 104.2 | 7,581.5 | 79.5 |
| 49 | 3,705.7 | 129.2 | 65,825.0 | 42.1 |
| 56 | 3,917.5 | 109.4 | 101,145.7 | 53.4 |
| 63 | 3,313.0 | 119.8 | 95,346.3 | 52.1 |
| 70 | 2,218.0 | 127.2 | 71,934.2 | 59.0 |

NUCLEIC ACID VACCINE COMPOSITION COMPRISING A LIPID FORMULATION, AND METHOD OF INCREASING THE POTENCY OF NUCLEIC ACID VACCINES

This application is a Divisional Application of U.S. patent application Ser. No. 16/482,500, filed Jul. 31, 2019 (now abandoned), which is a National Stage of International Application No. PCT/US18/25482, filed Mar. 30, 2018, and claims priority from U.S. Provisional Application No. 62/478,875, filed Mar. 30, 2017, the entire contents of each of which are incorporated herein by reference.

STATEMENT AS TO RIGHTS OR INVENTIONS MADE UNDER FEDERALLY SPONSORED RESEARCH AND DEVELOPMENT

This invention was made with government support from Research Institute for Infectious Diseases (RIID), a subordinate organization of the United States Army Medical Command. The U.S. government has certain rights in the invention.

FIELD OF THE INVENTION

This present invention provides a method to enhance the potency of plasmid-based nucleic acid vaccines and immunotherapies, composition therefor, and a composition containing a vaccine and lipid formulation with enhanced potency. In particular, purified plasmid nucleic acid encoding vaccine immunogens, or immune response molecules, are combined in a lipid formulation. This lipid formulation containing the vaccine, which is stable when refrigerated or frozen, is then delivered to a vaccine by either needle/syringe, jet injection, or microneedles. It had been found that by combining the nucleic acid vaccine with the lipid formulation, the level of immunogen, or immune response molecules, produced in vivo is increased and, in the case of a vaccine immunogen, the immune response is enhanced.

BACKGROUND OF THE INVENTION

Numerous nucleic acid vaccines for the protection and/or treatment of human and animal diseases (e.g. infectious diseases and cancer) are presently in clinical trials. In addition, nucleic acid vaccines are currently being used to produce candidate monoclonal and polyclonal antibody products for use as therapeutics, prophylactics, and assay reagents. One of the acknowledged drawbacks to nucleic acid vaccines is the lack of sufficient potency of the vaccines, especially for the production of immune responses in humans.

In particular, DNA vaccines are currently being used to produce candidate monoclonal and polyclonal antibody products for use as therapeutics, prophylactics, and assay reagents. DNA vaccination involves the direct introduction into appropriate tissues of a plasmid containing the DNA sequence encoding the antigen(s) against which an immune response is sought. One drawback of DNA vaccines in particular is the potency of the vaccines, especially for the production of immune responses in humans Methods to enhance potency include adjuvants, and using delivery technology that increases delivery of the DNA vaccine plasmid to cells (for example electroporation and jet injection). However, no method or composition has yet been found that produces exceptionally high levels of immunogen, i.e., potency.

In view of the lack of potency of nucleic acid vaccines, in particular DNA vaccines, using traditional delivery methods, a method of enhancing the potency of plasmid-based nucleic acid vaccines and immunotherapies is desired.

SUMMARY OF THE INVENTION

As mentioned above, the present invention provides a novel nucleic acid vaccine composition comprising one or more of a plasmid-based nucleic acid vaccine and immunotherapy, as well as a lipid formulation. In addition, the present invention provides a method of enhancing the potency of plasmid-based DNA vaccines and immunotherapies, by formulating a vaccine and/or immunotherapy in a lipid formulation. The present invention increases vaccine potency dramatically. It was unexpectedly discovered that the level of immunogen, or immune response molecules, produced in vivo is increased (versus administering merely the vaccine or immunotherapy) and, in the case of a vaccine immunogen, the immune response is enhanced.

In particular, in a first embodiment, a purified plasmid DNA encoding vaccine immunogens, or immune response molecules, is combined in a lipid formulation which is stable when refrigerated or stored frozen. The DNA vaccine and lipid formulation is then delivered to a vaccinee by either needle/syringe, jet injection, or microneedles. The lipid formulation contains one or more symmetric ionizable cationic lipids selected from among the following:

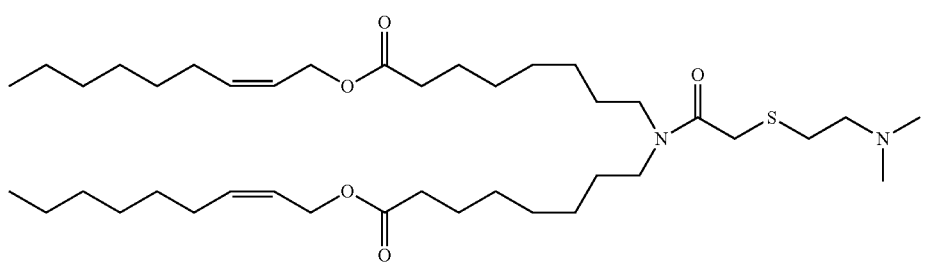

ATX-001

-continued
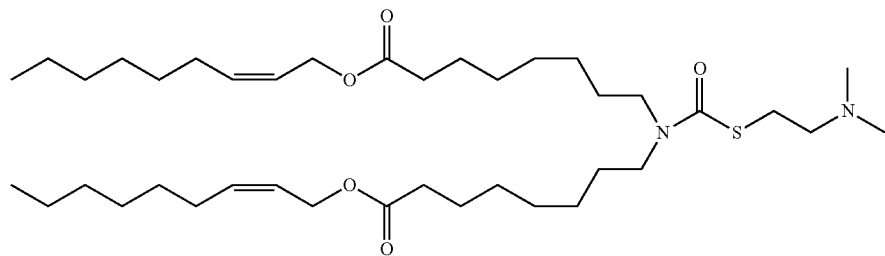
ATX-002
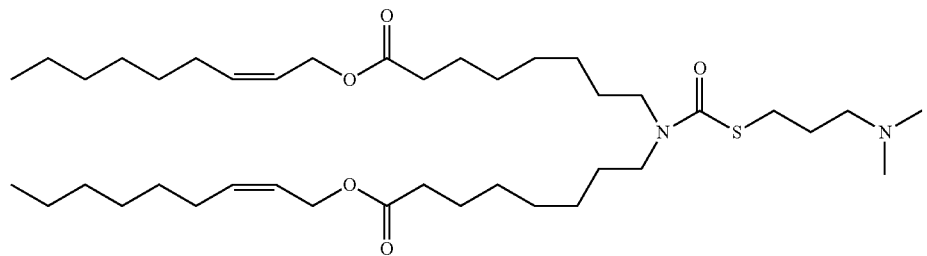
ATX-003
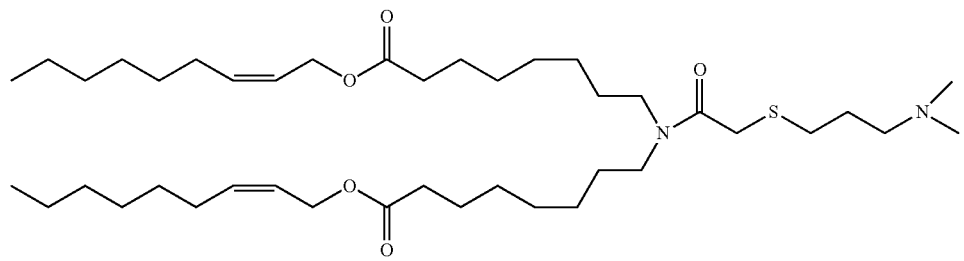
ATX-004
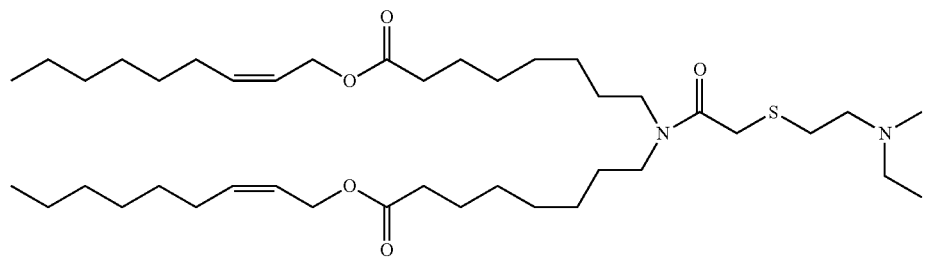
ATX-005
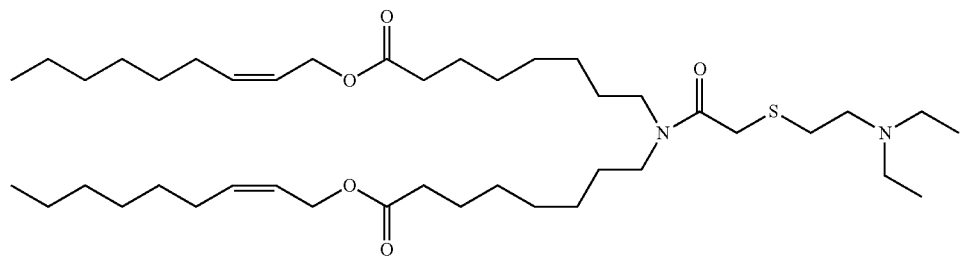
ATX-006
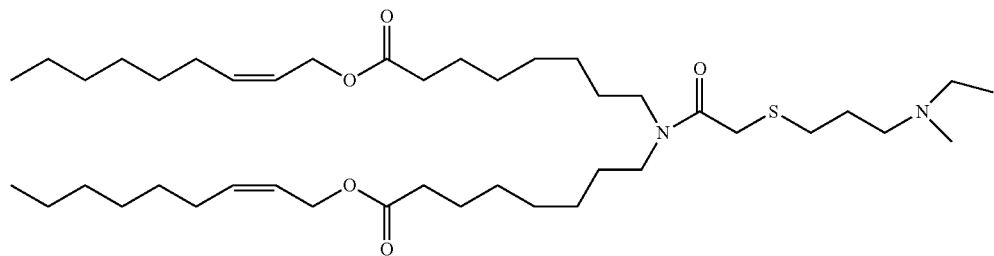
ATX-007

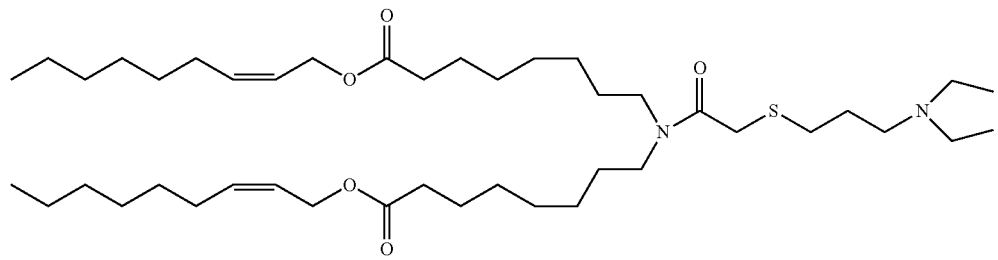
ATX-008
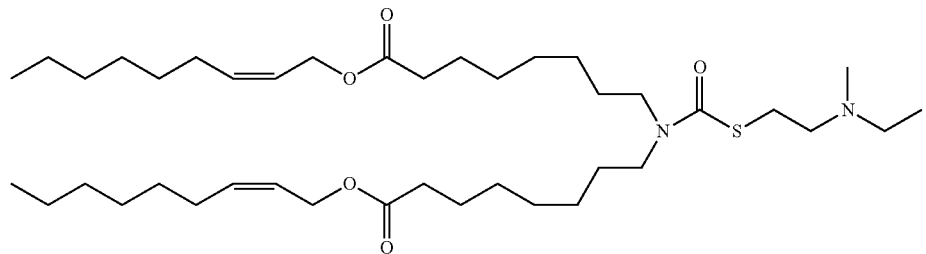
ATX-009
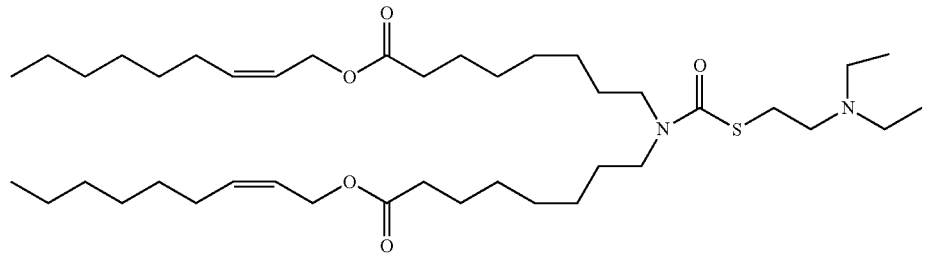
ATX-010
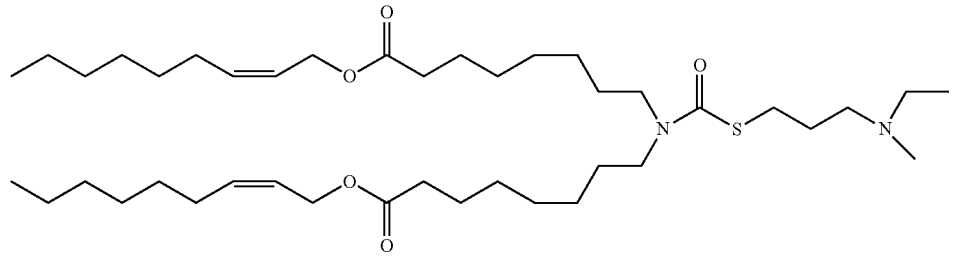
ATX-011
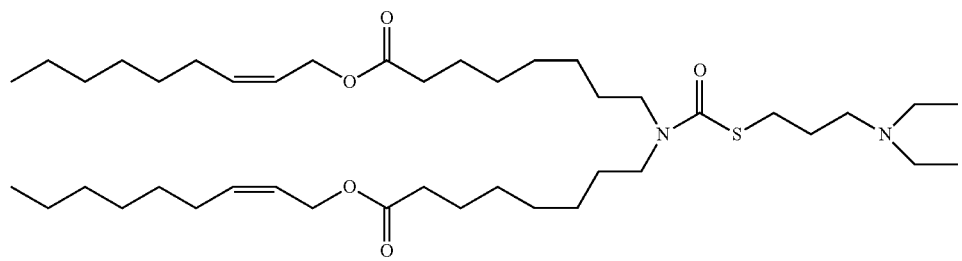
ATX-012
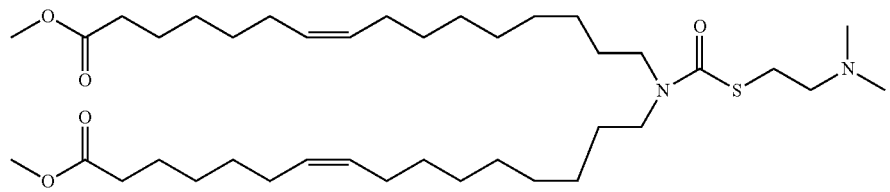
ATX-013

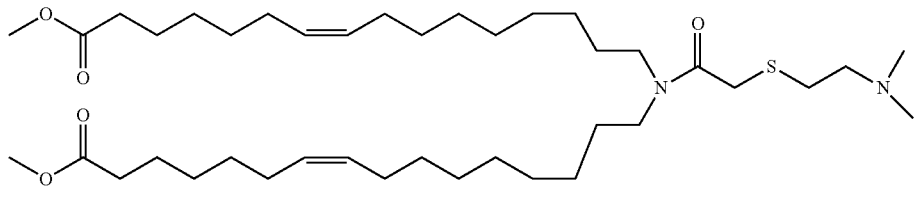
ATX-014
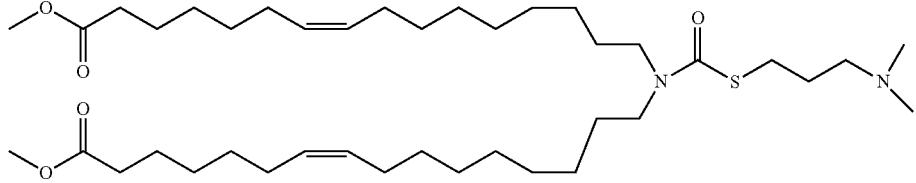
ATX-015
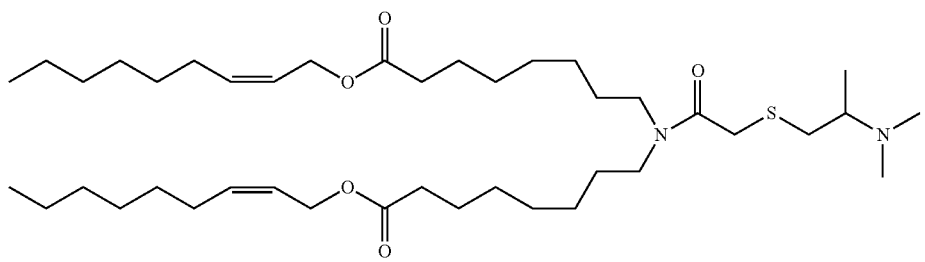
ATX-016
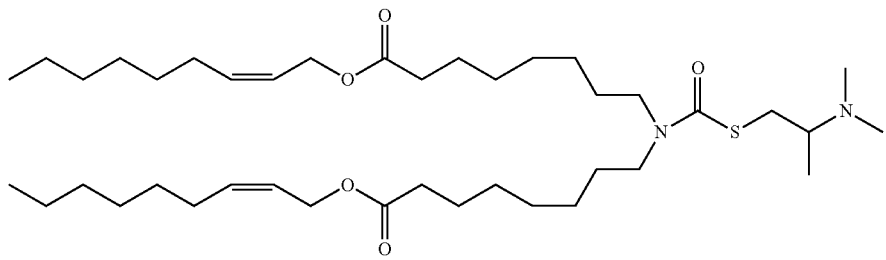
ATX-017
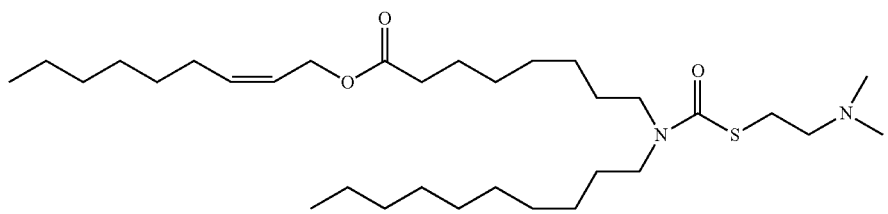
ATX-018
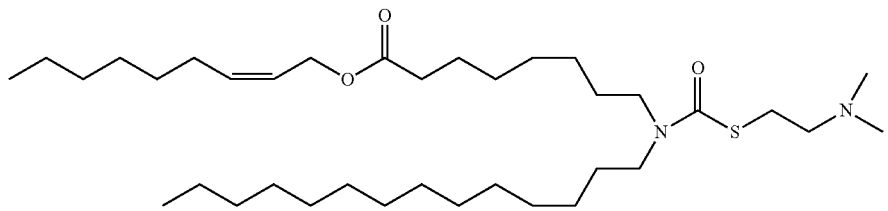
ATX-019
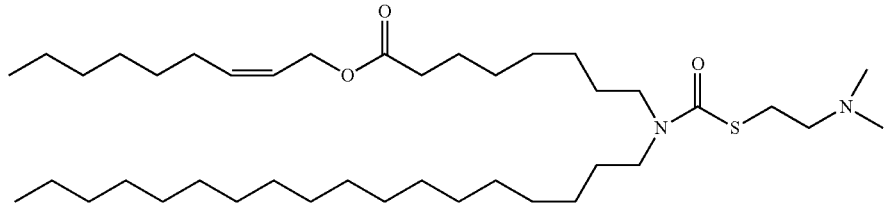
ATX-020

-continued
ATX-021
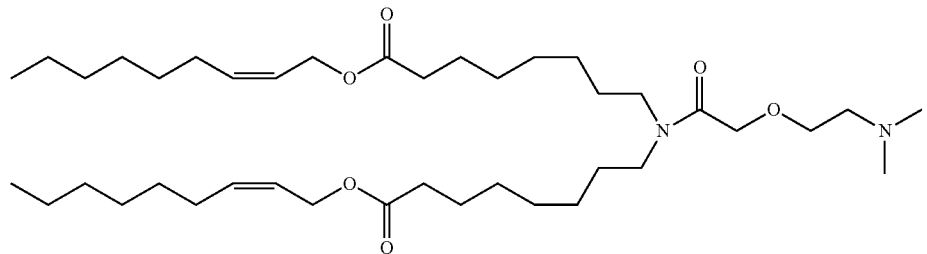
ATX-022
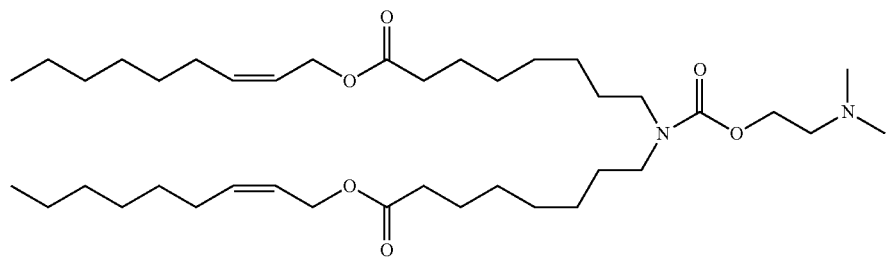
ATX-023
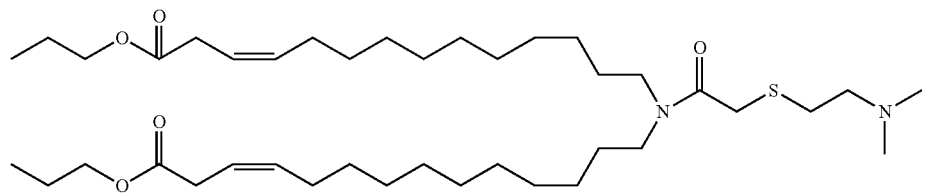
ATX-024
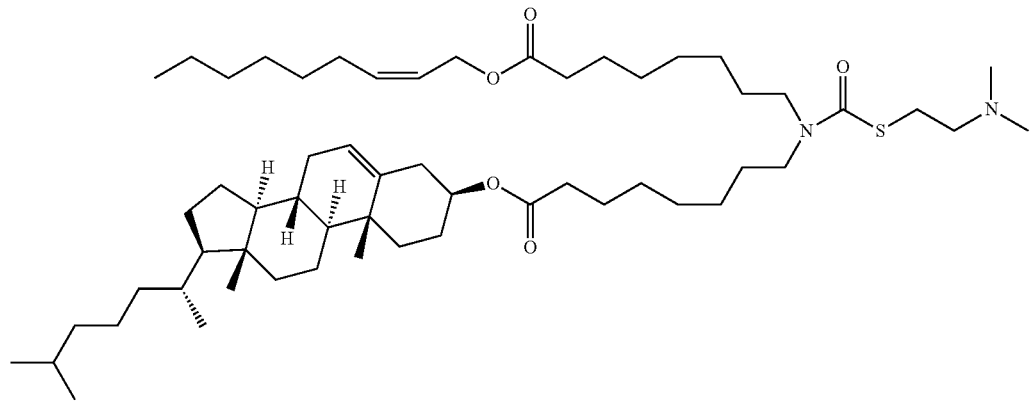
ATX-025
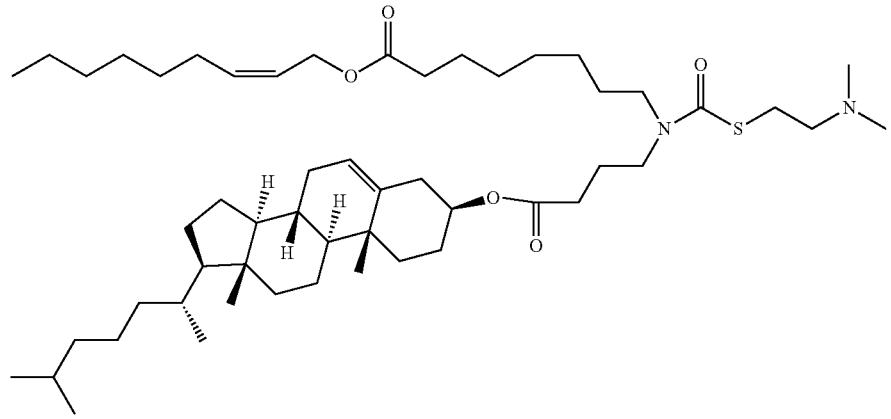

-continued

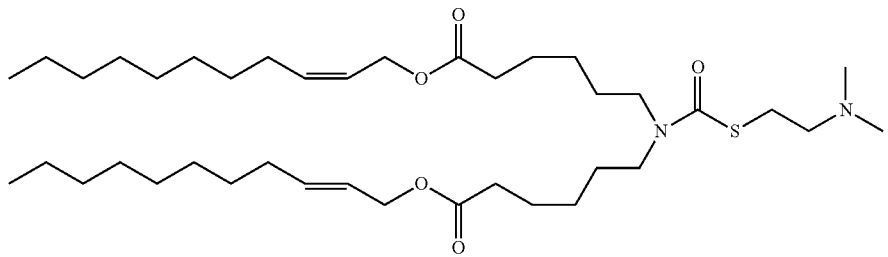

ATX-026

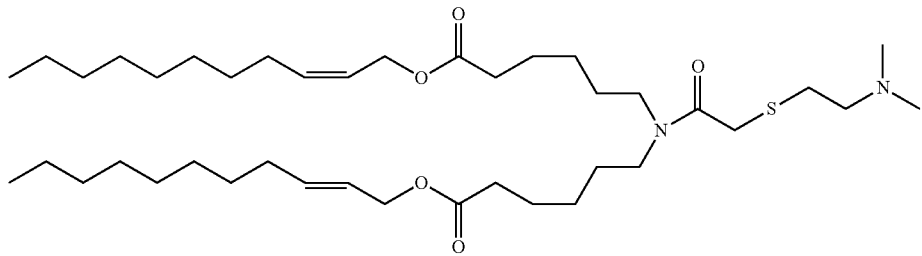

ATX-027

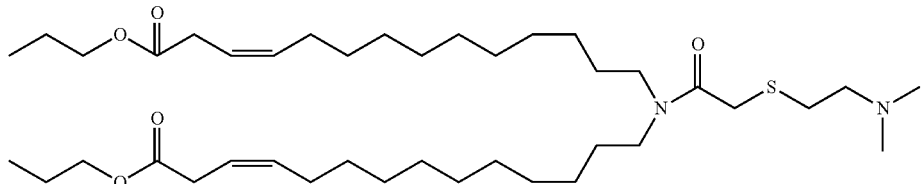

ATX-028

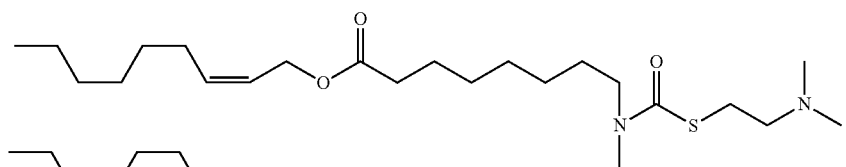

ATX-031

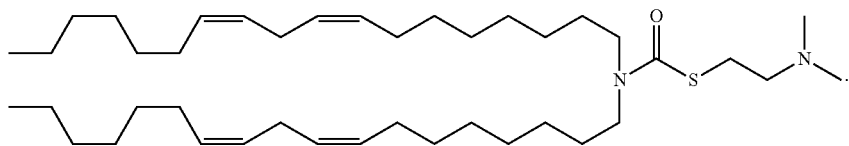

ATX-032

In a further embodiment, the lipid formulation mentioned above further contains one or more lipid excipients selected from 1,2-Distearoyl-sn-glycero-3-phosphocholine, Cholest-5-en-3β-ol, 1,2-Dimyristoyl-rac-glycero-3-methylpolyoxyethlene.

Figure 1:
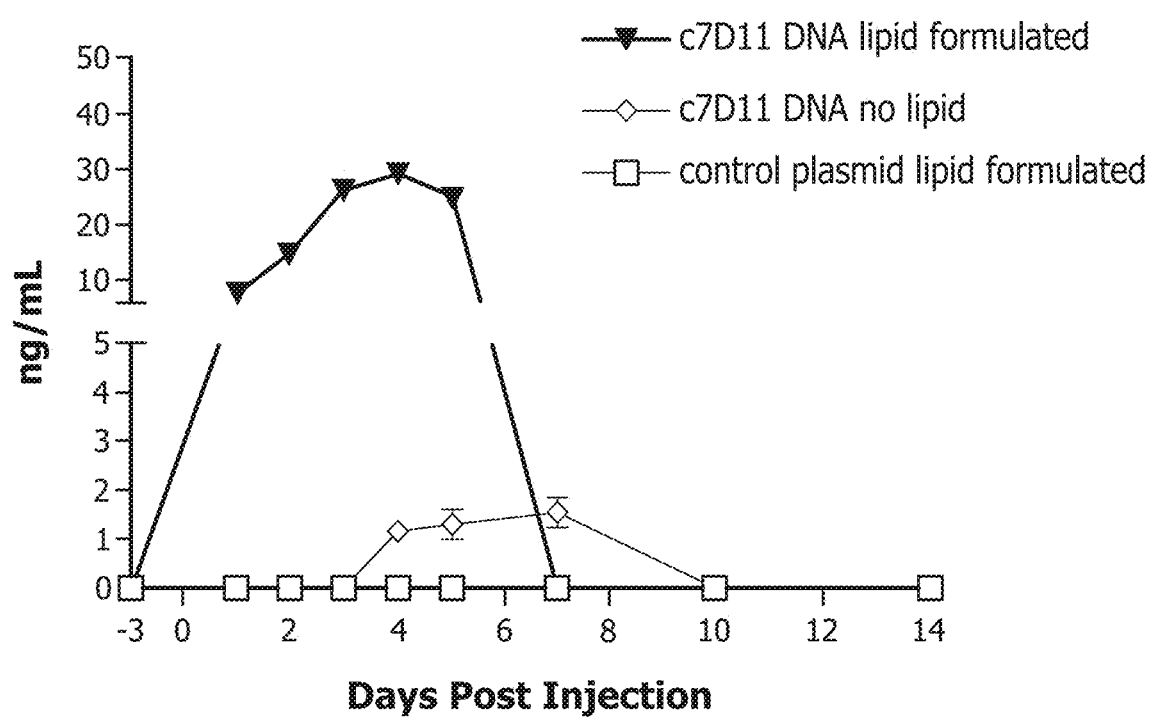
FIG. 1 is a graph illustrating the blood concentrations (in ng/ml) of human monoclonal antibodies detected and quantified in a rabbit at various time periods after administration of lipid-formulated DNA plasmid encoding the monoclonal antibody heavy (H) and light (L) chains, and controls thereto.

FIG. 2A is a graph illustrating the Andes virus pseudovirion neutralization levels of the rabbits mentioned above, over a period of 28 days.

FIG. 2B is a graph illustrating the Andes virus plaque reduction neutralization test levels (PRNT) of the rabbits mentioned above, over a period of 28 days.

FIG. 3 is a graph illustrating the results of a further plaque reduction neutralization test (PRNT) conducted with the two rabbits mentioned above, wherein the mean % neutralization vs. reciprocal sera dilutions from the two independent experiments was plotted is shown FIG. 4A shows an overview of an experiment comparing the immunogenicity of formulated versus unformulated Andes DNA vaccine in rabbits. FIG. 4B shows individual rabbit neutralizing antibody responses. Neutralizing antibodies were measured by Andes virus pseudovirion neutralization assay. 50% neutralization titers (PsVNA50) are reported. FIG. 4C shows a grouped neutralizing response. FIG. 4D contains the mean PsVNA50 titers and percent coefficient of variation (% CV) per day between the two groups that received either formulated or unformulated Andes DNA vaccine.

DETAILED DESCRIPTION OF THE INVENTION

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, the preferred materials and methods are described herein. In describing and claiming the present invention, the following terminology will be used.

It is also to be understood that the terminology used herein is for describing particular embodiments only and is not intended to be limiting.

The articles "a" and "an" are used herein to refer to one or to more than one (i.e., to at least one) of the grammatical object of the article. By way of example, "an element" means one element or more than one element. Thus, recitation of "a cell", for example, includes a plurality of the cells of the same type.

As discussed above, the present invention provides a novel nucleic acid vaccine composition comprising a lipid formulation, and vaccine immunogens or immune response molecules, wherein the lipid formulation is comprised of a symmetric ionizable cationic lipid.

The nucleic acid vaccine is, for example a DNA vaccine, in particular a purified plasmid DNA encoding vaccine immunogens, or immune response molecules. Such DNA vaccines can include, for example, hantavirus vaccines including those targeting Andes virus, Sin Nombre virus, Hantaan virus, and Puumala virus; South American arenavirus vaccines including those targeting Junin virus, Machupo virus, Guanarito virus, and Sabia virus; poxvirus DNA vaccines, alphavirus DNA vaccines, filovirus DNA vaccines, and Zika virus DNA vaccines. The preceding list includes anti-viral DNA vaccines, but DNA vaccines against cancer and other infectious diseases are possible vaccines-of-interest.

Hentavirus vaccines are described, for example, in Hooper J W, R. L. Brocato, S. A. Kwilas, CD Hammerbeck, MD Josleyn, M Royals, J Ballantyne, H Wu, J Jiao, H Matsushita, and E. J. Sullivan. DNA vaccine-derived human IgG produced in transchromosomal bovines protect in lethal models of hantavirus pulmonary syndrome. Sci Transl Med. 2014 Nov. 26; 6(264):264ra162. Kwilas S, Kishimori J, Josleyn M, Jerke K, Ballantyne J, Royals M, Hooper J W (2014). A Hantavirus Pulmonary Syndrome (HPS) DNA Vaccine Delivered using a Spring-Powered Jet Injector Elicits a Potent Neutralizing Antibody Response in Rabbits and Nonhuman Primates. Curr Gene Ther. Vol. 14, No. 3, 2014. Hooper J W, Josleyn M J, Ballantyne J, and R L Brocato (2013) A novel Sin Nombre virus DNA vaccine and its inclusion in a candidate pan-hantavirus vaccine against hantavirus pulmonary syndrome (HPS) and hemorrhagic fever with renal syndrome (HFRS). Vaccine. 31(40):43314-21. Hooper J W, Moon J, Paolino K, Necomber R, McLain D, Josleyn M J, Hannaman D, and CS Schmaljohn (2014). A Phase 1 clinical trial of Hantaan virus and Puumala virus M-segment DNA vaccines for hemorrhagic fever with renal syndrome delivered by intramuscular electroporation. Clinical Microbiology and Infection. May; 20 Suppl 5:110-7. doi: 10.1111/1469-0691.12553. Epub 2014 March; Boudreau E F, Josleyn M, Ullman D, Fisher D, Dalrymple L, Sellers-Myers K, Loudon P, Rusnak J, Rivard R, Schmaljohn C, Hooper J W (2012). A Phase 1 clinical trial of Hantaan virus and Puumala virus M-segment DNA vaccines for hemorrhagic fever with renal syndrome. Vaccine 30:1951-1958.

Arenavirus DNA vaccines are described, for example, in Golden J W, M Zaitseva, S Kapnick, R W Fisher, MG Mikolajczyk, J Ballantyne, H Golding and J W Hooper (2011). Polyclonal antibody cocktails generated using DNA vaccine technology protect in murine models of orthopoxvirus disease. Virology Journal 2011, 8:441.

Alphavirus DVA vaccines are described, for example, in Golden J W, M Zaitseva, S Kapnick, R W Fisher, MG Mikolajczyk, J Ballantyne, H Golding and J W Hooper (2011). Polyclonal antibody cocktails generated using DNA vaccine technology protect in murine models of orthopoxvirus disease. Virology Journal 2011, 8:441.

Filovirus DNA vaccines are described, for example, in Bounds C E, Kwilas S A, Kuehne A I, Brannan J M, Bakken R R, Dye J M, Hooper J W, Dupuy L C, Ellefsen B, Hannaman D, Wu H, Jiao J A, Sullivan E J, Schmaljohn C S (2015). Human Polyclonal Antibodies Produced through DNA Vaccination of Transchromosomal Cattle Provide Mice with Post-Exposure Protection against Lethal Zaire and Sudan Ebolaviruses. PLoS One sep 30; 10(9):e0137786. Grant-Klein, RJ, Altamura L A, Badger C V, Bounds C E, Van Deusen N M, Kwilas S A, Vu H A, Warfield K L, Hooper J W, Hannaman D, Dupuy L C, and CS Schmaljohn (2015) Codon-Optimized Filovirus DNA Vaccines Delivered by Intramuscular Electroporation Protect Cynomolgus Macaques from Lethal Ebola and Marburg Virus Challenges. Human Vaccine and Immunotherapy. 2015 May 21:0.

Poxvirus vaccines are describd, for example, in Hooper, J. W., E. Thompson, C. Wilhelmsen, M. Zimmerman, M. Ait Ichou, S. E. Steffen, C. S. Schmaljohn, A. L. Schmaljohn, and P. B. Jahrling (2004). Smallpox DNA vaccine protects nonhuman primates against lethal monkeypox. Journal of Virology 78:4833-4843.

Zika DNA vaccines are described, for example, in Stein D R, Golden J W, Griffin B D, Warner B M, Ranadheera C, Scharikow L, Sloan A, Frost K L, Kobasa D, Booth S A, Josleyn M, Ballantyne J, Sullivan E, Jiao J A, Wu H, Wang Z, Hooper J W, Safronetz D (2017) Human polyclonal antibodies produced in transchromosomal cattle prevent lethal Zika virus infection and testicular atrophy in mice. Antiviral Research. 2017 October; 146:164-173. Gaudinski M R, Houser K V, Morabito K M, Hu Z, Yamshchikov G, Rothwell R S, Berkowitz N, Mendoza F, Saunders J G, Novik L, Hendel C S, Holman L A, Gordon I J, Cox J H, Edupuganti S, McArthur M A, Rouphael N G, Lyke K E, Cummings G E, Sitar S, Bailer R T, Foreman B M, Burgomaster K, Pelc R S, Gordon D N, DeMaso C R, Dowd K A, Laurencot C, Schwartz R M, Mascola J R, Graham B S, Pierson T C, Ledgerwood J E, Chen G L; VRC 319; VRC 320 study teams. Safety, tolerability, and immunogenicity of two Zika virus DNA vaccine candidates in healthy adults: randomised, open-label, phase 1 clinical trials. Lancet. 2017 Dec. 4. pii: S0140-6736(17)33105-7. doi: 10.1016/S0140-6736(17)33105-7.

Each of the above references are incorporated herein by reference for their description of the relevant DNA vaccines. The skilled artisan will understand that the instantly described invention is not limited to these specific DNA vaccines, but may also be used with any other DNA vaccines known to the skilled artisan.

The symmetric ionizable cationic lipid is in particular selected from among:
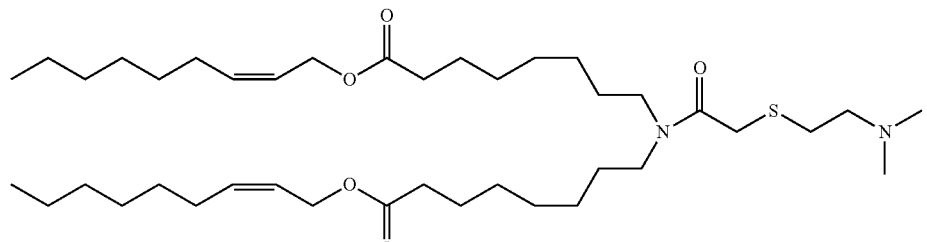
ATX-001
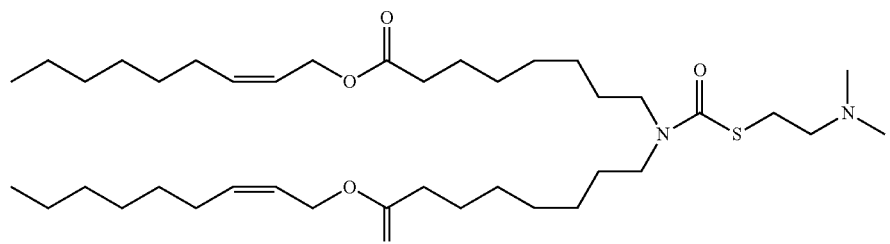
ATX-002
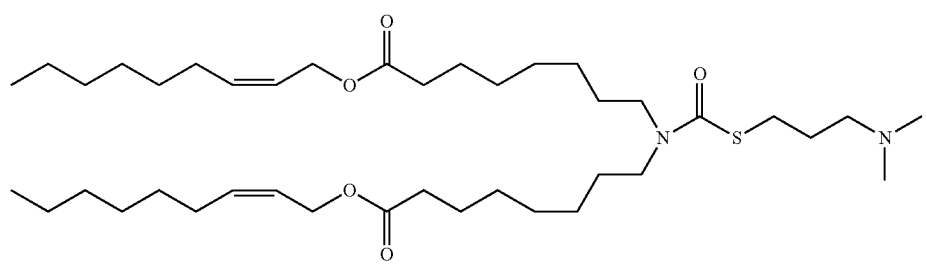
ATX-003
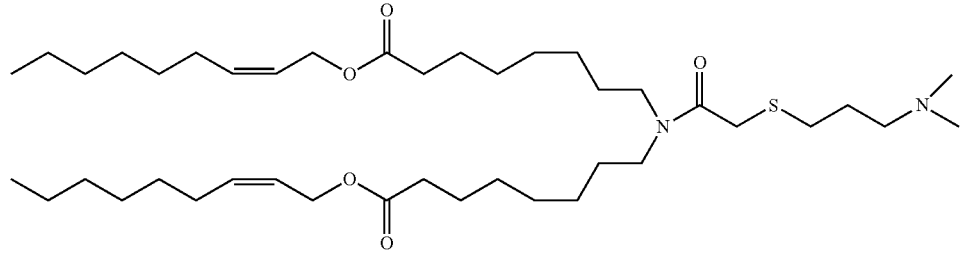
ATX-004
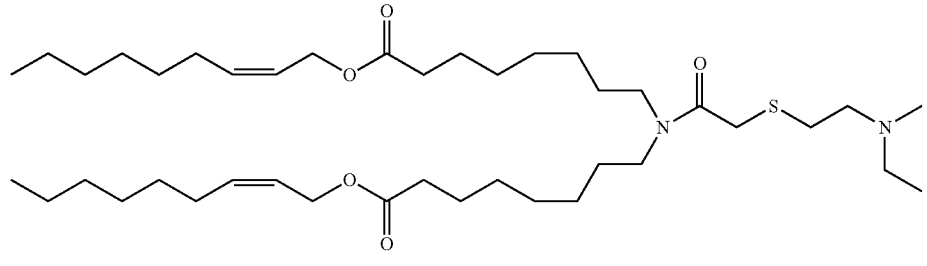
ATX-005
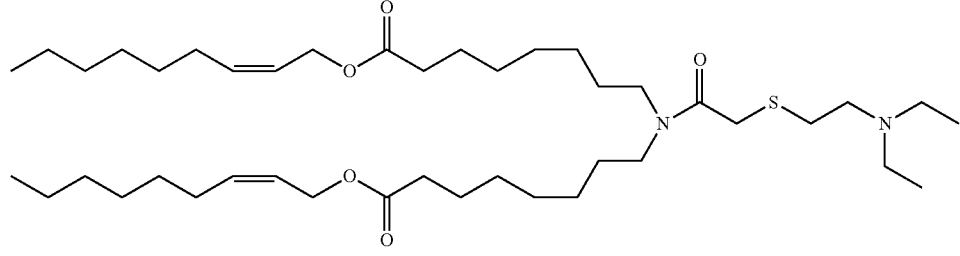
ATX-006

ATX-007
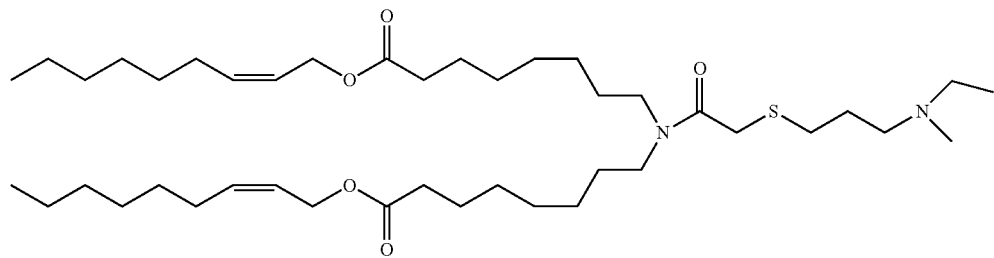
ATX-008
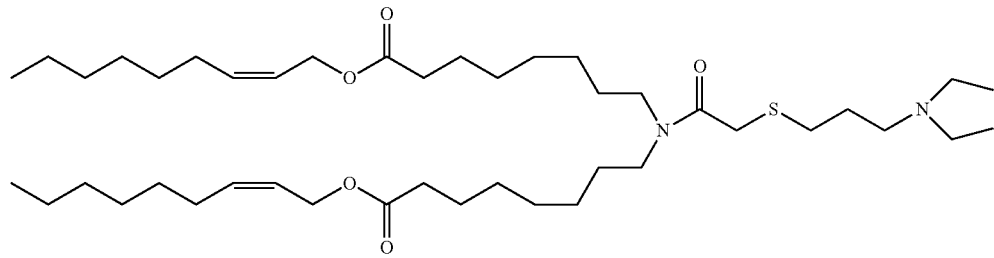
ATX-009
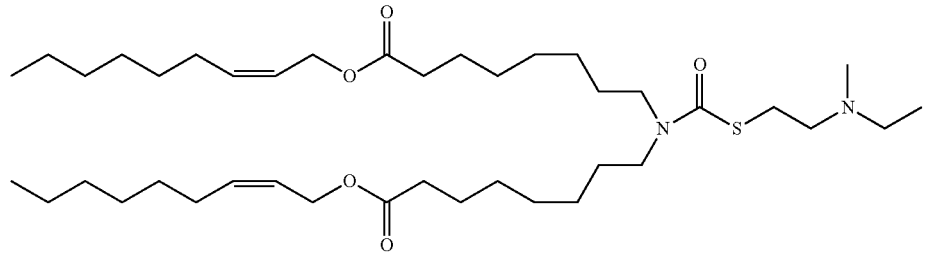
ATX-010
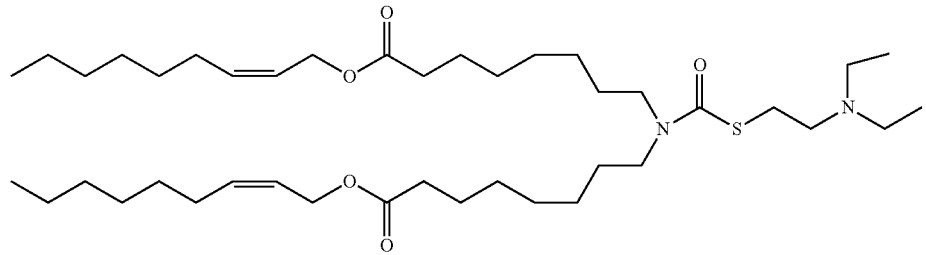
ATX-011
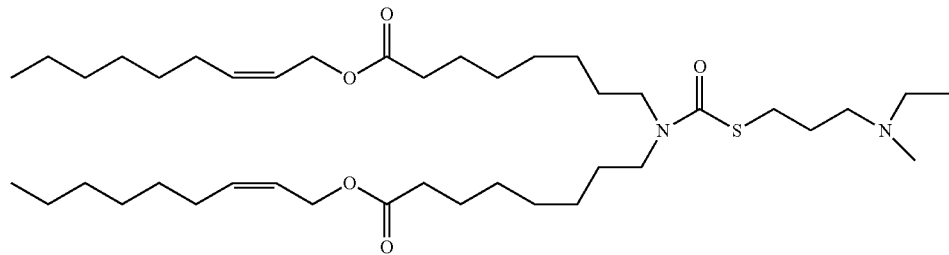
ATX-012
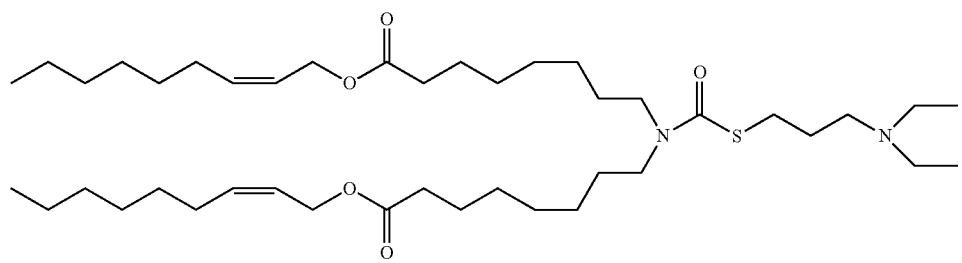

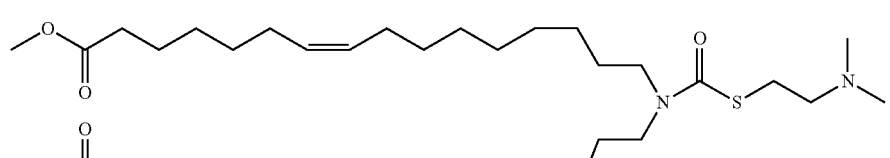
ATX-013
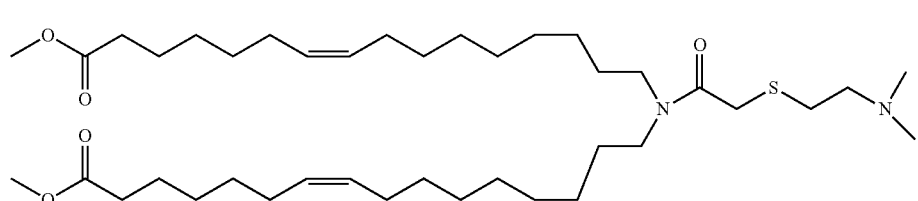
ATX-014
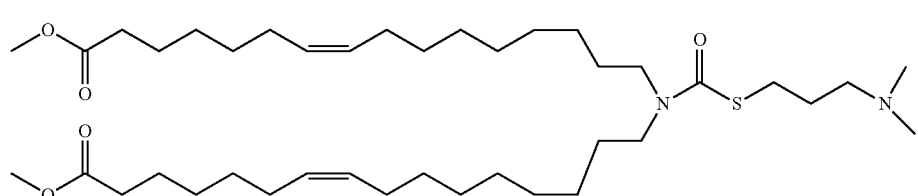
ATX-015
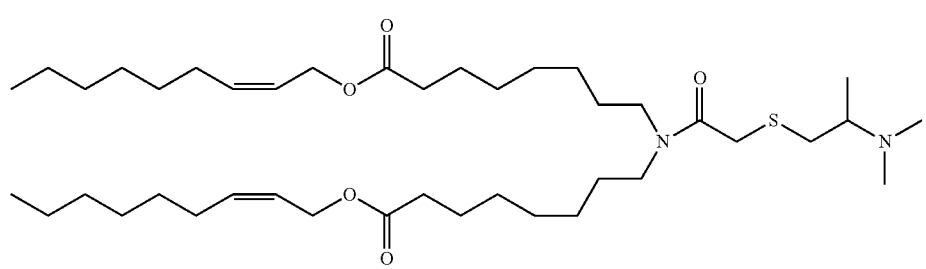
ATX-016
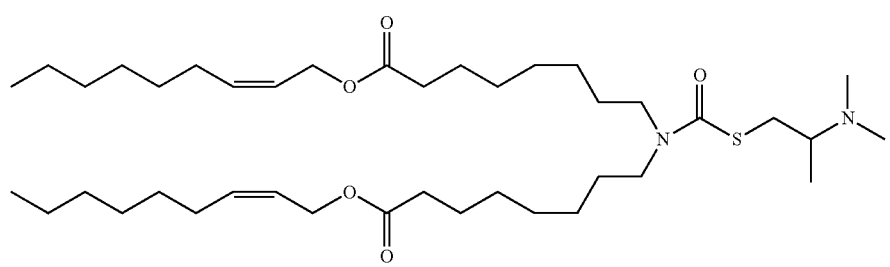
ATX-017
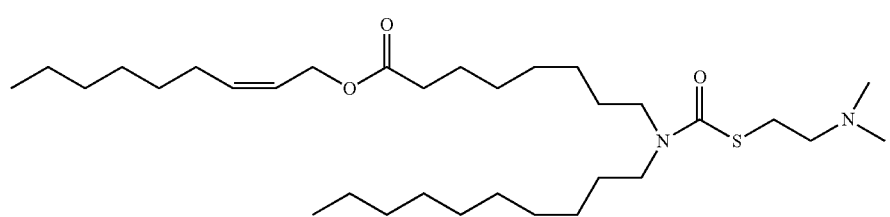
ATX-018
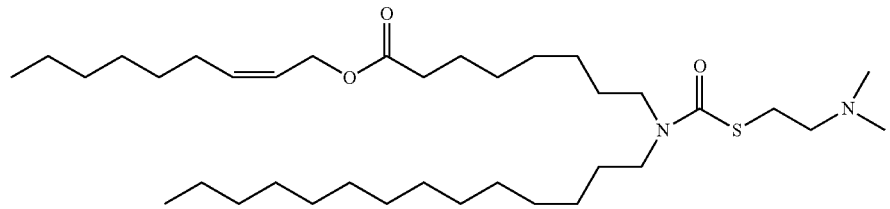
ATX-019

-continued
ATX-020
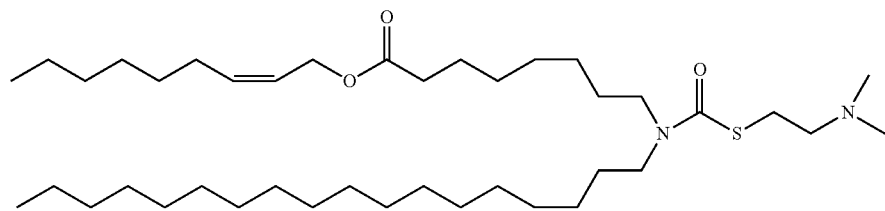
ATX-021
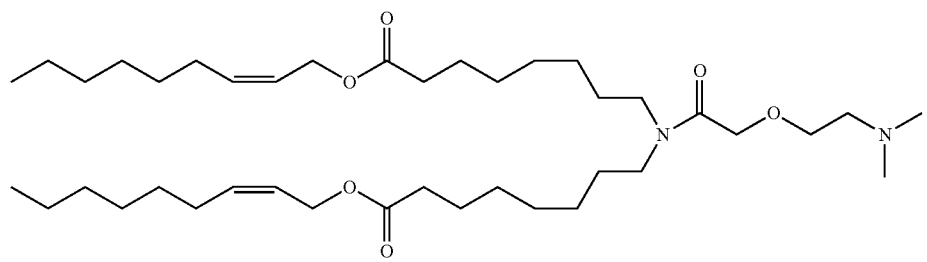
ATX-022
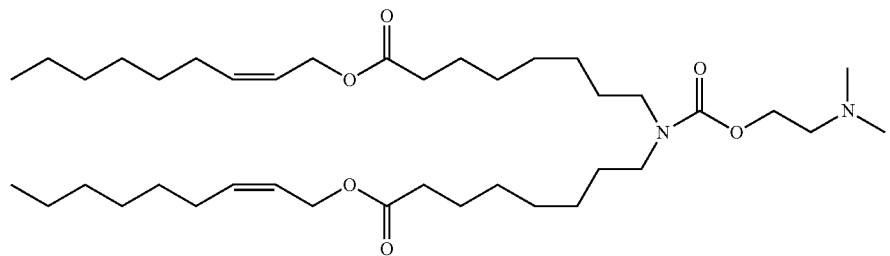
ATX-023
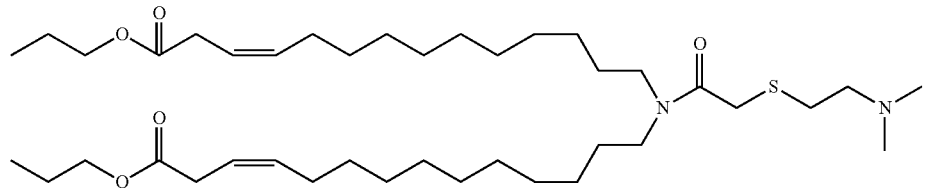
ATX-024
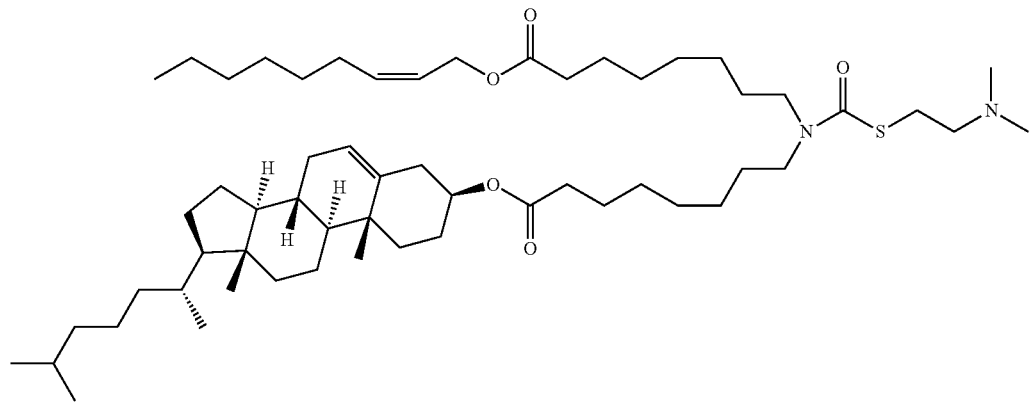

ATX-025
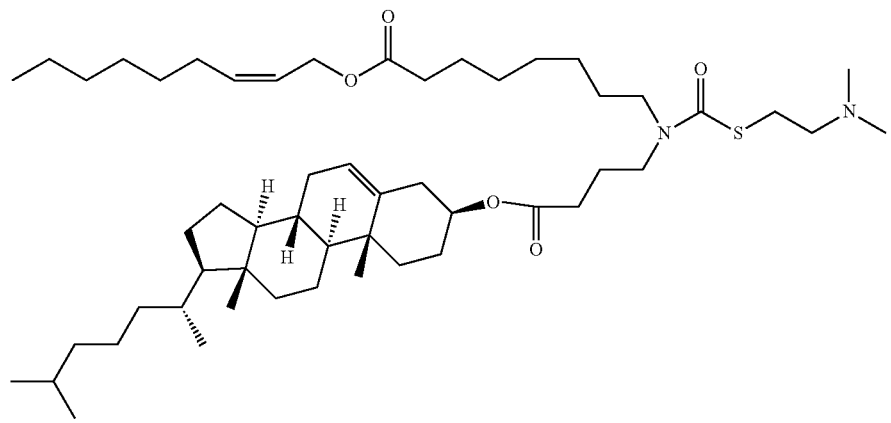
ATX-026
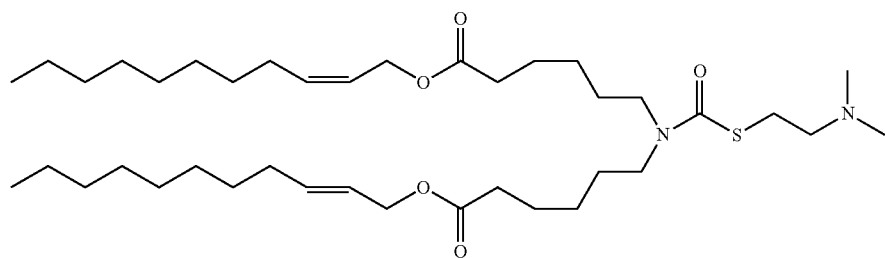
ATX-027
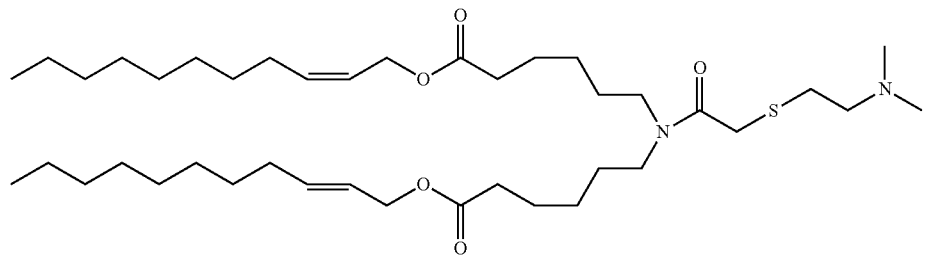
ATX-028
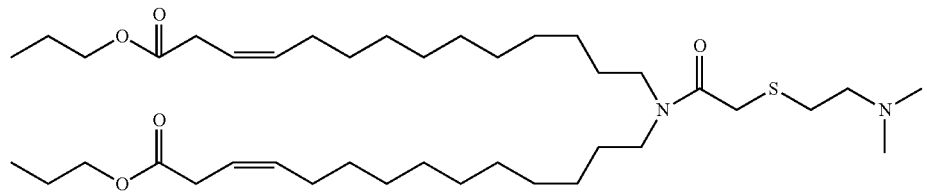
ATX-031
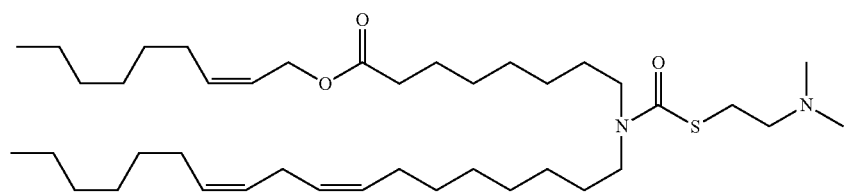

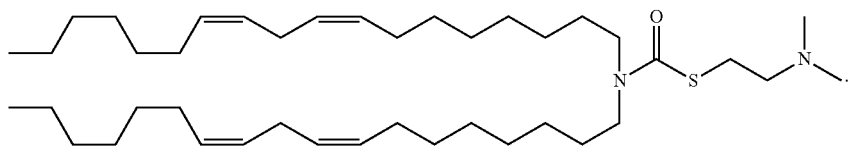

ATX-032

What are also described herein are any of the compounds listed in ATX-001 to ATX-032, or a pharmaceutically acceptable salt thereof, in a lipid composition, comprising a nanoparticle or a bilayer of lipid molecules. The lipid bilayer preferably further comprises a neutral lipid or a polymer. The lipid composition preferably comprises a liquid medium. The composition preferably further encapsulates a nucleic acid. The nucleic acid is preferably a DNA vaccine. The lipid composition preferably further comprises a nucleic acid and a neutral lipid or a polymer. The lipid composition preferably encapsulates the nucleic acid.

A composition containing a cationic lipid compound may be 30-70% cationic lipid compound, 0-60% cholesterol, 0-30% phospholipid and 1-10% polyethylene glycol (PEG). Preferably, the composition is 30-40% cationic lipid compound, 40-50% cholesterol, and 10-20% PEG. In other preferred embodiments, the composition is 50-75% cationic lipid compound, cholesterol, and 5 to 10% phospholipid, and 1-10% PEG. The composition may contain cationic lipid compound, 25-35% cholesterol, and 5-10% PEG. The composition may contain up to 90% cationic lipid compound and 2 to 15% helper lipid.

The formulation may be a lipid particle formulation, for example containing 8-30% compound, 5-30% helper lipid, and 0-20% cholesterol; 4-25% cationic lipid, 4-25% helper lipid, 2 to 25% cholesterol, 10 to 35% cholesterol-PEG, and 5% cholesterol-amine; or 2-30% cationic lipid, 2-30% helper lipid, 1 to 15% cholesterol, 2 to 35% cholesterol-PEG, and 1-20% cholesterol-amine; or up to 90% cationic lipid and 2-10% helper lipids, or even 100% cationic lipid.

These symmetric ionizable cationic lipids can exist in unsolvated and solvated forms, including hydrated forms. In general, the solvated forms, with pharmaceutically acceptable solvents such as water, ethanol, and the like, are equivalent to the unsolvated forms for the purposes of this disclosure. These symmetric ionizable cationic lipids and salts, solvates thereof, may exist in their tautomeric form (for example, as an amide or imino ether). All such tautomeric forms are contemplated herein as part of the present disclosure. These symmetric ionizable cationic lipids, and their methods of synthesis, are described for example in U.S. Pat. No. 9,593,077, which is incorporated by reference for description of the ionizable cationic lipids and their synthesis. The synthetic methods set forth in that reference for the cationic lipid compounds can be synthesized with the skills in the art. The skilled of the art will recognize other methods to produce these compounds. For Example, ATX-001 can be made, for example, by the following procedure:

Di((Z)-non-2-en-1-yl) 8,8'((tertbutoxycarbonyl) azanediyl) dioctanoate (0.023 mol, 15 g) was dissolved in dry dichloromethane (DCM) (200 ml). Trifluoroacetic acid (TFA) was added at 0° C. to initiate a reaction. The reaction temperature was slowly allowed to warm to room temperature over for 30 minutes with stirring. Thin layer chromatography showed that the reaction was completed. The reaction product was concentrated under vacuum at 40° C. and the crude residue was diluted with DCM, and washed with a 10% NaHCO$_3$ solution. The aqueous layer was re-extracted with DCM, and the combined organic layers were washed with brine solution, dried over Na$_2$SO$_4$ and concentrated. The collected crude product (12 grams) was dissolved in dry DCM (85 ml) under nitrogen gas. Triphosgene were added and the reaction mixture was cooled to 0° C., and Et$_3$N was added drop wise. The reaction mixture was stirred overnight at room temperature. Thin layer chromatography showed that the reaction was completed. DCM solvent was removed from the reaction mass by distillation under N$_2$. The reaction product was cooled to 0° C., diluted with DCM (50 ml), and 2-((2-(dimethylamino)ethyl)thio) acetic acid (0.039 mol, 6.4 g) and carbodiimide (EDC HCl) (0.054 mol, 10.4 g). The reaction mixture was then stirred overnight at room temperature. Thin layer chromatography showed that the reaction was completed. The reaction product was diluted with 0.3M HCl solution (75 ml), and the organic layer was separated. The aqueous layer was re-extracted with DCM, and the combined organic layers were washed with 10% K$_2$CO$_3$ aqueous solution (75 ml) and dried over anhydrous Na$_2$SO$_4$. Concentration of the solvent gave a crude mass of 10 gram. The crude compound was purified by silica gel column (100-200 mesh) using 3% MeOH/DCM. The yield was 10.5 g (68%).

The cationic lipid compounds may be combined with an agent to form microparticles, nanoparticles, liposomes, or micelles. The agent to be delivered by the particles, liposomes, or micelles may be in the form of a gas, liquid, or solid, and the agent may be a polynucleotide, protein, peptide, or small molecule. The lipomacrocycle compounds may be combined with other cationic lipid compounds, polymers (synthetic or natural), surfactants, cholesterol, carbohydrates, proteins, lipids, etc. to form the particles. These particles may then optionally be combined with a pharmaceutical excipient to form a pharmaceutical composition.

The present description provides novel nucleic acid vaccine formulations, in particular DNA vaccines, based on the use of such cationic lipid compounds. The system may be used in the pharmaceutical/drug delivery arts to deliver polynucleotides, proteins, small molecules, peptides, antigen, drugs, etc. to a patient, tissue, organ, or cell. These novel compounds may also be used as materials for coating, additives, excipients, materials, or bioengineering The lipids used in the instant invention can, for example, be in the form of particles. Such lipid particles may have, for example, a mean diameter of approximately 80-110 nm with low polydispersity values (<0.2). In one embodiment, the lipid of the present invention is an ionizable lipid that is positively charged at low pH but relatively neutral at physiological pH.

The nucleic acid vaccine is formulated in the lipid formulation, for example, by Encapsulating the nucleic acid, in particular DNA, with the lipid formulation disclosed herein. As a result, the lipid formulation encapsulates and protects the immunogen/immune response molecules in nano-scale lipid particles comprised of specialized lipid components. The nucleic acid vaccine, in particular DNA vaccine, compositions of this disclosure may be administered by various routes, for example, to effect systemic delivery via intravenous, parenteral, intraperitoneal, or topical routes.

Functionally, the lipid is responsible for binding the nucleic acid and promoting endosomolytic activity. This delivery system is also optimized for high nucleic acid encapsulation efficiency (important for manufacturing/cost-of-goods) and exquisite size control (important for the regulatory authority approval). The lipid particles fuse to a cell membrane and deliver its nucleic acid payload to the cytoplasm by using a pH-mediated disruption of the endosome followed by rapid biodegradation of the lipid inside the cell.

In an additional embodiment, the lipid formulation utilized in the instant invention further contains one or more lipid excipients selected from 1,2-Distearoyl-sn-glycero-3-phosphocholine, Cholest-5-en-30-ol, or 1,2-Dimyristoyl-rac-glycero-3-methylpolyoxyethlene. These additional lipid excipients can be mixed with the symmetric ionizable cationic lipids described above to form the lipid formulation.

Example 1: Vaccination with Unformulated DNA Vaccine

In previous studies, rabbits were vaccinated with unformulated Andes DNA vaccine and the following results were obtained:

Study 1 (unformulated DNA). Eight rabbits were vaccinated with unformulated Andes DNA vaccine using PharmaJet IM, 2 mg/injection. After 1 vaccination (Week 4) PsVNA80=81, 40, 57, <20, <20, <20, 43, 34. GMT=27 (when <20 are given value of 10).

Study 2 (unformulated DNA). A preclinical toxicity study in rabbits was performed. Eight rabbits received 4 vaccinations using unformulated Andes DNA vaccine, 2 mg/injection×4 injections per vaccination (a total of 32 mg of DNA). The PsVNA80 after 3 vaccinations was GMT=7,781 (Lower 95% 5,061, Upper 95% 11,966) and after 4 vaccinations was 18,899 (Lower 95% CI 7,181, Upper 95% CI 49,738) (J. Hooper, Contributing Scientist Report AN-8327478-G, unpublished). This represents the predicted maximum neutralizing activity that can be produced in rabbits vaccinated with unformulated Andes DNA vaccine delivered by disposable syringe jet injection.

Example 2: Vaccination with DNA Vaccine Formulated with the Inventive Lipid Formulation The present inventors hypothesized that the lipid formulation disclosed herein may increase the potency of nucleic acid vaccines. To evaluate this possibility, testing was performed on a rabbit, wherein the rabbit was given a single intramuscular injection (PharmaJet Stratis) of a vaccine containing 1 mg of DNA vaccine plasmid pWRG/c7d11 (H+L) combined with the lipid formulation of the present invention. Sera specimens were collected before injection (Day-4, relative to injection) and after (Days 1-5, 7, 10, 14 and 21, relative to injection). Recombinant monoclonal human antibody was detected and quantified from the sera by an immunogen specific ELISA. The data is presented with historical controls (n=4) in which rabbits received four intramuscular injections of plasmid pWRG/c7d11 (H+L) (1 mg/injection, 4 mg total).

As shown in FIG. 1 below, these tests demonstrated that the lipid formulation of a plasmid expressing a protein-of-interest resulted in a >10-fold increase in serum levels of that protein in injected rabbits while using one quarter of the amount of nucleic acid. In particular, human monoclonal antibody was detected and quantifiable 24 hours after injection of the lipid formulated plasmid, whereas unformulated plasmid nucleic acid was not detectable until at least day 5. Sera from rabbits injected with formulated nucleic acid yielded approximately 30 ng/ml. In contrast, sera from rabbits injected with unformulated (i.e., without being blended in a lipid formulated) nucleic acid ranged from approximately 0.4 ng/ml to 2/4 ng/ml, substantially less than the concentration obtained with the formulated nucleic acid.

Next, a rabbit (designated as rabbit #81) was vaccinated using PharmaJet needle-free jet injection (intramuscular) on Day 0, relative to injection, with 1 mg of lipid-formulated Andes virus (ANDY) DNA vaccine. Rabbit #80 was vaccinated with the same lipid-formulated DNA vaccine vector as a control (i.e., pWRG/c7d11[H+L] above). Serum collected on Days −4-7, 14, and 21 were evaluated for neutralizing activity by pseudovirion neutralization assay (PsVNA) and by plaque reduction neutralization test (PRNT) using Andes virus. As shown in FIG. 2A below, PsVNA80 titers were plotted. Each symbol represents the mean±SD of duplicates. The positive control was Day 116 sera from a rabbit vaccinated 3× with the ANDY DNA vaccine by intramuscular electroporation. As shown in FIG. 2B, PRNT80 titers were plotted. Each symbol represents the mean±SD of two independent experiments. The limit of quantitation was 20 (shaded grey) for both PRNT and PsVNA. PsVNA80 and PRNT80 titers greater than 1,000 are considered high (dotted line).

The results of the above described tests indicated that neutralizing antibodies were detected as early as Day 7 after injection of the lipid-formulated ANDY DNA vaccine, and reached high titer by Day 14. The Day 14 and 21 PsVNA80 tites were as high or higher than those obtained historically using intramuscular electroporation (Hooper et al. Journal of Virology: Vo82 No. 3 p. 1331-1338. See FIG. 2 in that publication). The PRNT titers were similar to the PsVNA titers and demonstrated that the neutralizing antibody activity was against authentic virus. There was no neutralizing activity in the negative control rabbit as measured by PRNT. Mean Day 14 and 21 PsVNA80 titers were 14,150 and 14,507, respectively. Mean Day 14 and 21 PRNT80 titers were both 5120. PsVNA50 and PRNT50 titers were >10,000 after a single vaccination (data not shown). Accordingly, it was shown that use of lipid-formulated plasmid DNA vaccine increased the neutralizing antibody response dramatically, and increases immunogenicity of DNA vaccines.

Figure 3:
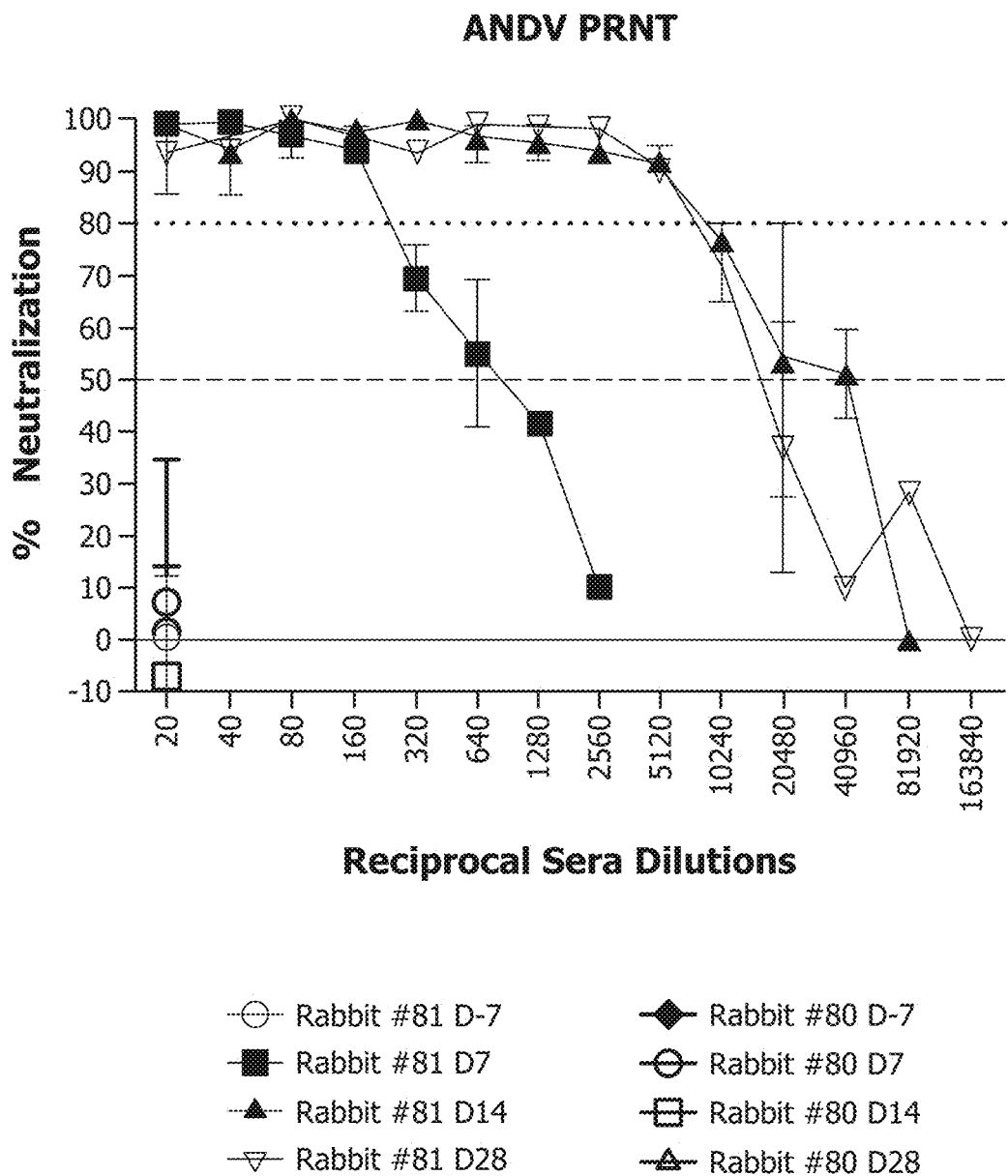

In a subsequent plaque reduction neutralization test (PRNT), rabbit #81 was administered a single injection of formulated ANDY DNA vaccine, pWRG/AND-M(opt2) on Day 0. Sera were collected on Days −7, 7, 14, and 28 and evaluated in an ANDVPRNT. The mean % neutralization from two independent experiments was plotted, and the results presented in FIG. 3 below. It was found that rabbit #80 did not exhibit neutralizing activity at the lowest dilution tested (1:20) for any timepoint. Rabbit #81 did not exhibit neutralizing antibodies until after vaccination. At the first timepoint after vaccination (D7), Rabbit #81 already had substation levels of neutralizing antibodies in its serum (PRNT80=160). By D14 this animal had very high levels of neutralizing activity (PRNT80=5120). The PRNT80 titer was the same on D28. PRNT80 is defined as the reciprocal of the highest dilution that reduces plaque number by 80% relative to No Antibody control wells. The test data demonstrated that a rabbit vaccinated with a lipid formulated ANDY DNA vaccine (i.e., a formulation containing the lipid of the present invention) developed high-titer neutralizing antibodies against authentic Andes virus (ANDY). Note that the PRNT titer data is plotted in FIG. 2

Figures 4A, 4B:
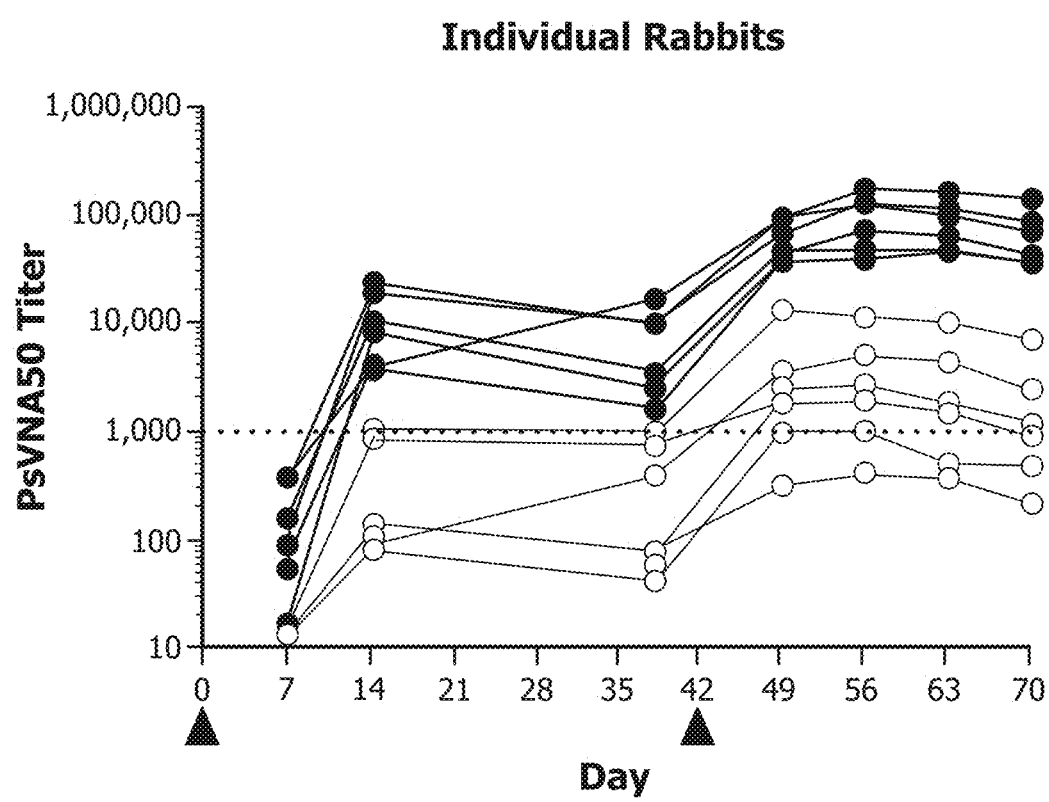
Figures 4C, 4D:
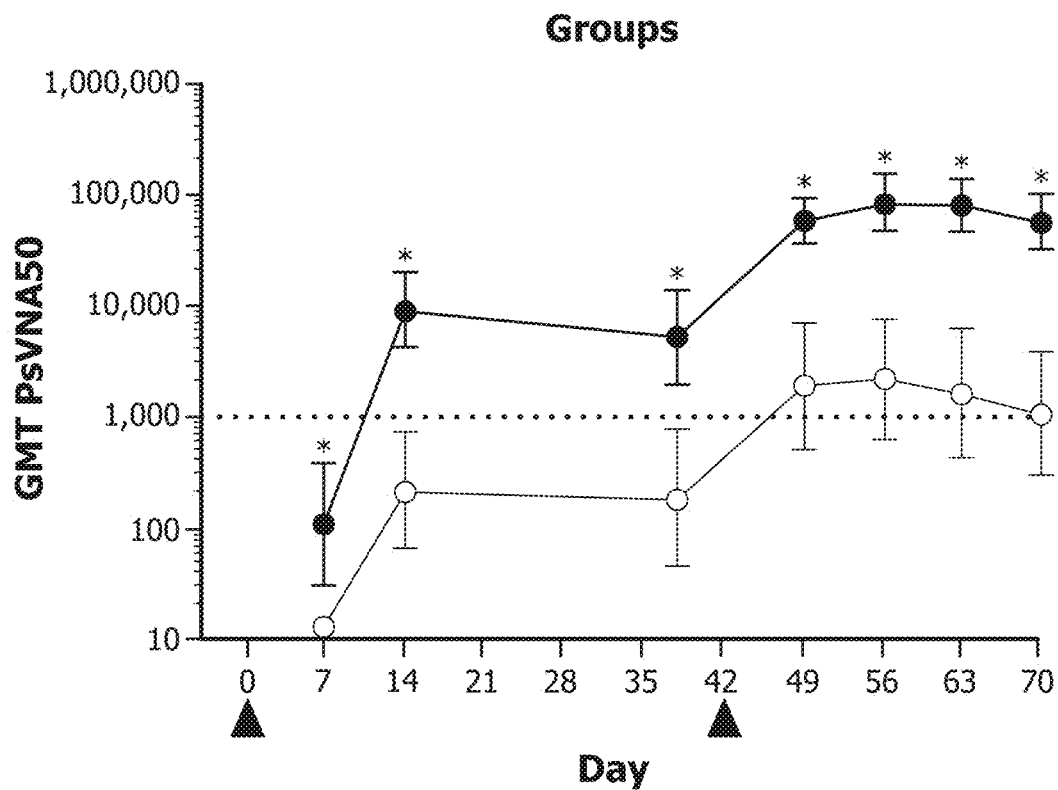

In another study, the effect of formulations on the neutralizing responses produced by rabbits vaccinated with ANDY DNA was compared. Utilizing twelve rabbits, 6 female rabbits per group were injected with either the formulated ANDY DNA vaccine or the DNA vaccine in the absence of formulation (unformulated) (FIG. 4A). All the animals received the same concentration of DNA (100 ug). A vaccine boost was administered 42 days later. From the sera of these rabbits, neutralizing responses were measured using the PsVNA. Animals that received the formulated vaccine had detectable neutralizing activity 7 days after vaccination (PsVNA50 mean of 180.8), whereas animals in the unformulated did not (background of 14.1) (FIG. 4 table). At all time-points analyzed, sera from the formulated group had a higher PsVNA50 (FIG. 4 B, C). With the exception of Day 14, PsVNA50 values were at least 10 times larger from sera of the animals receiving formulated vaccine than to animals receiving the unformulated DNA. This number difference increased to 18-32 times following the second vaccination (boost) (FIG. 4 Table). Also, PsVNA 50 neutralizing responses varied less between the animals vaccinated with the formulated DNA than between the unformulated DNA group. That is, the coefficient of variation was consistently less in the formulated ANDY DNA group at all time points.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

All references discussed herein are incorporated by reference. One skilled in the art will readily appreciate that the present invention is well adapted to carry out the objects and obtain the ends and advantages mentioned, as well as those inherent therein. The present invention may be embodied in other specific forms without departing from the spirit or essential attributes thereof and, accordingly, reference should be made to the appended claims, rather than to the foregoing specification, as indicating the scope of the invention.

What is claimed is:

1. A method of enhancing the potency of a DNA vaccine comprising a DNA plasmid, comprising formulating the DNA plasmid in a lipid formulation comprising a symmetric ionizable cationic lipid to obtain a lipid-formulated DNA vaccine, wherein the DNA vaccine is selected from the group consisting of: a hantavirus vaccine, a South American arenavirus vaccine, a poxvirus DNA vaccine, an alphavirus DNA vaccine, a filovirus DNA vaccine, and a Zika virus DNA vaccine, wherein the DNA plasmid is encapsulated in the lipid formulation, and wherein the symmetric ionizable cationic lipid is selected from the group consisting of:

ATX-004
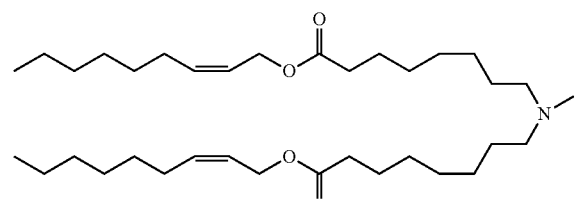
ATX-005
ATX-006
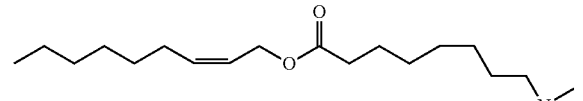
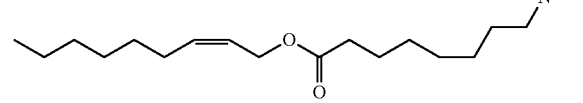
ATX-007
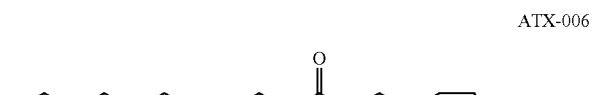
ATX-008
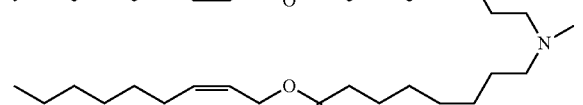
ATX-009
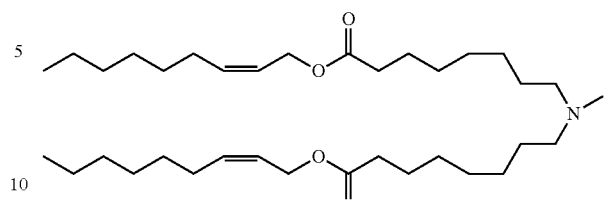
ATX-010
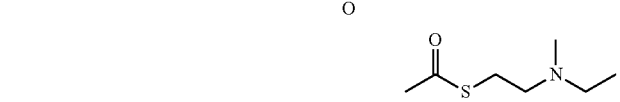
ATX-011
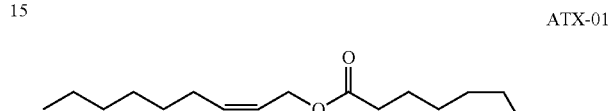
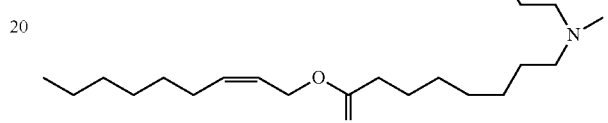
ATX-012
ATX-013
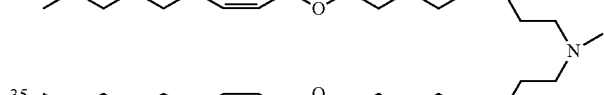

ATX-014
ATX-015
ATX-016
ATX-017
ATX-018
ATX-019
ATX-020
ATX-021
ATX-022
ATX-023
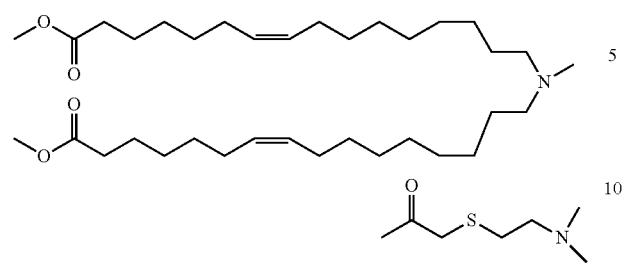
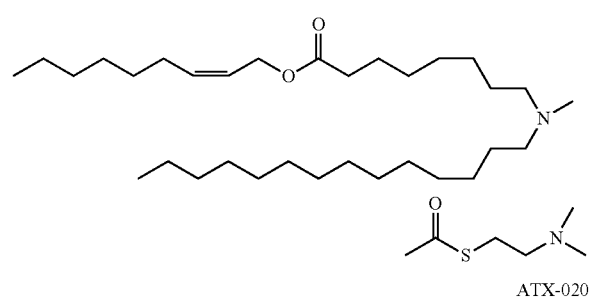
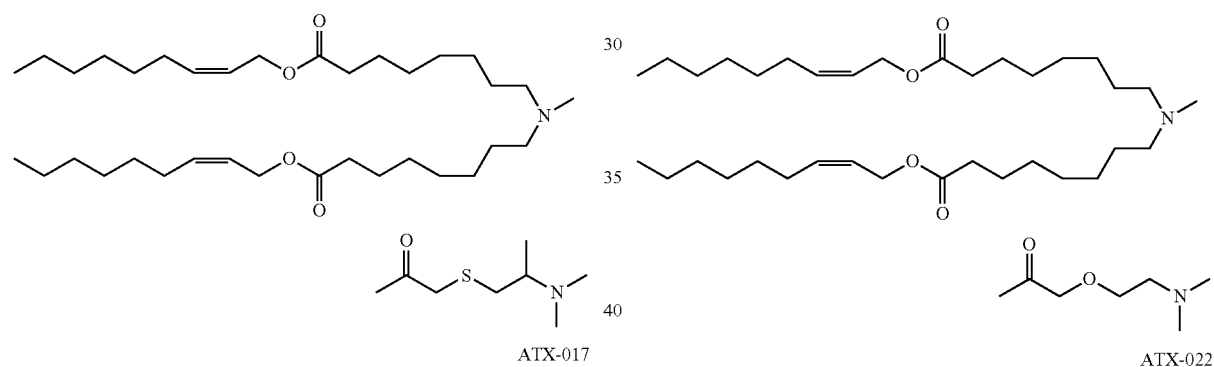
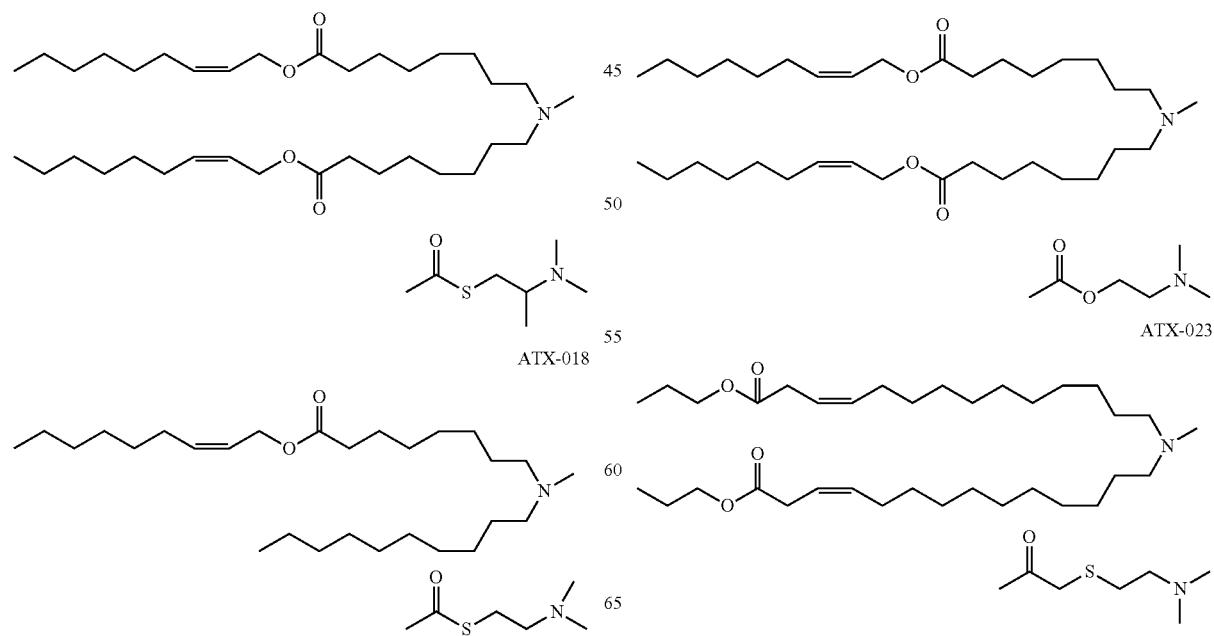

2. The method of claim 1, wherein the lipid formulation further comprises one or more lipid excipients selected from the group consisting of 1,2-Distearoyl-sn-glycero-3-phosphocholine, Cholest-5-en-3β-ol, and 1,2-Dimyristoyl-rac-glycero-3-methylpolyoxyethlene.

3. The method of claim 1, wherein the plasmid DNA encodes an immunogen.

4. The method of claim 3, wherein the immunogen is a viral vaccine immunogen.

5. The method of claim 1, wherein the hantavirus vaccine comprises an Andes virus vaccine, a Sin Nombre virus vaccine, a Hantaan virus vaccine, a Puumala virus vaccine, and wherein the South American arenavirus vaccine comprises a Junin virus vaccine, a Machupo virus vaccine, a Guanarito virus vaccine, or a Sabia virus vaccine.

6. The method of claim 1, wherein the symmetric ionizable cationic lipid in the lipid formulation is in the form of particles having a mean diameter of approximately 80-110 nm and polydispersity <0.2.

7. The method of claim 1, wherein the obtained lipid-formulated DNA vaccine is in the form of nano-scale particles.

8. The method of claim 2, wherein the plasmid DNA encodes an immunogen.

9. The method of claim 8, wherein the immunogen is a viral vaccine immunogen.

10. The method of claim 2, wherein the hantavirus vaccine comprises an Andes virus vaccine, a Sin Nombre virus vaccine, a Hantaan virus vaccine, a Puumala virus vaccine, and wherein the South American arenavirus vaccine comprises a Junin virus vaccine, a Machupo virus vaccine, a Guanarito virus vaccine, or a Sabia virus vaccine.

11. The method of claim 2, wherein the symmetric ionizable cationic lipid in the lipid formulation is in the form of particles having a mean diameter of approximately 80-110 nm and polydispersity <0.2.

12. The method of claim 2, wherein the obtained lipid-formulated DNA vaccine is in the form of nano-scale particles.

* * * * *